United States Patent [19]

Lepere et al.

[11] Patent Number: 4,635,061
[45] Date of Patent: Jan. 6, 1987

[54] RECEIVER FOR A PULSED DOPPLER RADAR SYSTEM

[75] Inventors: Guy Lepere, St. Cyr L'Ecole; Rolland Younes, St. Maur; Cristobal M. Ramirez, Paris, all of France

[73] Assignee: Thomson-CSF, Paris, France

[21] Appl. No.: 609,819

[22] Filed: May 14, 1984

[30] Foreign Application Priority Data

May 26, 1983 [FR] France ................................. 83 08728

[51] Int. Cl.[4] ............................................. G01S 13/76
[52] U.S. Cl. ................................................... 342/195
[58] Field of Search ............... 343/5 NQ, 7.7, 17.1 R; 375/96, 88, 80; 364/724

[56] References Cited

U.S. PATENT DOCUMENTS

| 3,619,586 | 11/1971 | Hoff et al. ........................... 364/724 |
| 3,742,500 | 6/1973 | Freedman ............................ 343/7.7 |
| 3,877,011 | 4/1975 | Holberg et al. ...................... 343/7.7 |
| 3,950,750 | 4/1976 | Churchill et al. ................... 343/5 NQ |
| 3,962,704 | 6/1976 | Evans .................................... 343/7.7 |
| 4,035,799 | 7/1977 | Hsiao .................................... 343/7.7 |
| 4,334,313 | 6/1982 | Gitlin et al. ........................... 364/724 |
| 4,404,561 | 9/1983 | Mulder et al. ...................... 343/5 NQ |

OTHER PUBLICATIONS

Radar Handbook, M. I. Skolnik, 1970, pp. 5-46.

Primary Examiner—Thomas H. Tarcza
Assistant Examiner—Donald E. Hayes, Jr.
Attorney, Agent, or Firm—Cushman, Darby & Cushman

[57] ABSTRACT

A receiver for a pulsed Doppler radar system comprising, connected in series, the following elements: an IF amplifier whose band width is equal to n times the spectral width of the transmitted pulses, a coherent IF detector, an A/D coder which operates at a sampling frequency at least equal to the passband of the IF amplifier and a digital filter whose pulse response is matched to the shape of the transmitted pulses. In a variant, the receiver comprises two signal channels I and Q.

11 Claims, 9 Drawing Figures

FIG_2

FIG_3

FIG_6

FIG_4

FIG_5

FIG_7

FiG_8

RECEIVER FOR A PULSED DOPPLER RADAR SYSTEM

BACKGROUND OF THE INVENTION

1. Field of the Invention:

The present invention relates generally to digital techniques for processing analog signals; it relates more particularly to receiver for a pulsed Doppler radar system.

2. Description of the Prior Art:

The basic structures and operation of Doppler radar systems are described in different technical publications. For example, the work by M. I. SKOLNIK called "Radar Handbook", 1970, published by Mc Graw-Hill describes such basic structures. Referring more particularly to the chapters relating to moving target visualization techniques (VCM) using digital techniques for processing the echo signals supplied by the receiver, these techniques are known under the name DMTI (Digital Moving Target Indicator).

In known VCM radar receivers, the output of the selective intermediate frequency amplifier (IF) is connected to two phase detectors which operate in phase quadrature to supply bipolar video frequency signals representing the in phase (I) and in quadrature (Q) components of the output signals of the IF amplifier. The output of each of these phase detectors is connected to a low-phase filter, the output of which is sampled by a sampler-disabler controlled by a clock signal synchronous with the signal triggering off the transmission pulses. The frequency of this clock signal is substantially equal to twice the inverse of the pulse duration ($\delta$). The amplitude of the output samples of the sampler-disabler is coded on $P_o$ levels by an analog-digital coder for supplying words of $N_o$ binary digits such that $P_o = S^{No}$. Subsequently, a digital processor carries out, in real time, on the digital signals output by each of these two A/D coders), filtering operations intended to discriminate the echos of the moving targets and to reject the echos of fixed targets and the ground return.

In the VCM radar receivers of the prior art, the particularly critical elements are the sampler-disablers and the A/D coders, which elements may operate over the whole amplitude dynamic of the echo signals. In practice, A/D coders are formed capable of providing a high number $P_o$ of levels, for example 4096 levels corresponding to words of 12 binary digits, including the sign bit, and this at rates of the order of 1 MHz or more. These devices for digitally coding the instantaneous amplitude of the output signals of the phase detectors are of delicate construction and their manufacturing cost remains extremely high. Another disadvantage of these radar receivers of the prior art is related to the fact that the filter "matched" to the pulse signals transmitted by the radar transmitter is formed for intermediate frequency operation (IF); however, it has already been proposed to form the "matched" filter for video frequency operation each of the signal channels I and Q. However, in all cases, the matched filters as presently formed are an approximation of the "optimum matched" filter, which is a first cause of degradation in the detection performance of the radar system. A further disadvantage of these conventional receivers comes from the fact that technologically the sampling rate of the output signals from the phase detectors remains limited if the amplitude resolution performance cannot be sacrificed (number of levels $P_o$). In addition, even if the NYQUIST-SHANON sampling criterion is complied with, that is to say that the sampling rate of the output signals of the phase detectors should be substantially equal to twice the inverse of the duration of the pulse signals transmitted, the echo signals are not always sampled at the precise moment when their level is maximum. The result is a second cause of degradation of the optimum detection performance of the radar system.

The aim of the invention is to overcome the above mentioned drawbacks of the radar receivers of the prior art.

SUMMARY OF THE INVENTION

To attain this aim, a receiver for a pulse Doppler radar system, including a micro wave frequency input mixer and a coherent intermediate frequency local oscillator, comprises: a clock signal generator which is synchronized by the signals triggering off the transmitted pulses, this signal generator delivering a sampling signal at a frequency equal to $2.n$ times the spectral width of the transmitted pulses, and is connected to the input mixer, an intermediate frequency amplifier having a band width equal to the frequency of the sampling signal, which intermediate frequency amplifier is connected to at least one signal channel which comprises, connected in series: a phase detector controlled by the output signal of the coherent intermediate frequency local oscillator, an analog-digital coder which is synchronized by the sampling signal for coding over P levels the bipolar output signal of the phase detector, and a digital filter "matched" to the pulse signals transmitted for supplying a digital output signal on m.p levels, with m equal to or greater than n.

BRIEF DESCRIPTION OF THE DRAWINGS

Other features will be clear from the detailed description of the invention, with reference to the accompanying drawings; in these drawings.

DESCRIPTION OF THE PREFERRED EMBODIMENTS

Before going ahead with a detailed description of the invention, the basic notions relative to the "matched" filter will be recalled. The "optimum matched" filter is that one in which the ratio of the power of the data signal to the power of the thermal noise of the radar system is maximum; that is to say that the optimum matched filter corresponds to the self-correlation operation $\phi(o)$ of the information signal s(t):

$$\phi(o) = \int s^2(t)dt$$

The pulse response h(t) of the matched filter is:

$$h(t) = k_o s(T_o - t)$$

where s(t) is the information signal to which the filter is matched.

$T_o$ is the time delay required for making the filter physically feasible and $K_o$ is an arbitrary gain constant.

The matched filter may also be defined in the frequency range by:

$$H(f) = K_o \cdot e^{-j2\pi f T_o} \cdot S(f)$$

where S(f) is the FOURIER transform of the information signal.

The energy of the information signal for unitary impedance is:

$$Es = \int s^2(t)dt = \int /S(f)/^2 df$$

and the energy $N_o$ of the thermal noise of the radar system is:

$$N_o = Kts$$

where K is Boltzman's constant and Ts the noise temperature of the radar system.

If the effective noise band width of the matched filter has for value $B_n$, the signal/noise ratio (S/N) at the output of this filter is:

$$S/N = \frac{S^2(t)}{KT_s B_n} = \frac{Es}{N_o}$$

In radar systems, the A/D coders operate in real time on output signals from the receiver and must operate at a high rate, of the order of 1 MHz or more, as pointed out in the preamble of the description, and at the same time it is desirable to code digitally the amplitude of the samples taken over 10 to 12 bits depending on the VCM factor required. Attempts to obtain a high resolution of the A/D coders may lead to the last bit being a random value which reflects more the internal noise of the circuits and of the power supply source than the real level of the sample to be coded. The uncertainty about this last bit is known as the coding noise and it depends on the type of A/D coder used. Even if the A/D coder is perfect, noises appear because the number $P_o$ of coding levels is always limited, from which there results a second noise source which is known as the quantization noise of the A/D coder.

The above considerations must always be taken into account in designing the receiver of a Doppler radar system.

Figure 1:
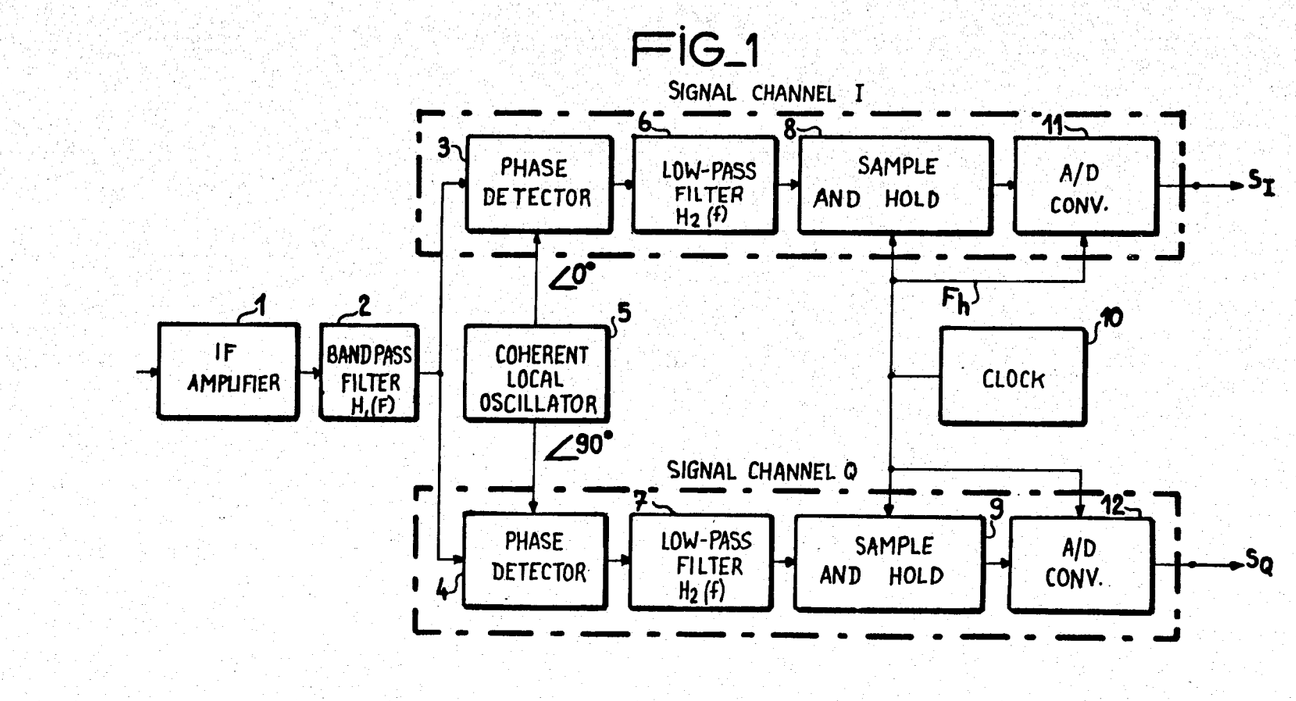
FIG. 1 is a functional block diagram of a radar receiver of the prior art.

FIG. 1 is a functional block diagram which shows a conventional embodiment of a radar receiver of the prior art which delivers output signals in the form of coded samples. In this receiver, a selective amplifier 1 which operates at an intermediate frequency (IF) receives at its input the output signals from a microwave frequency input mixer (not shown in this Figure). It can however be noted that in certain forms of construction, the receiver comprises a second frequency change situated between the microwave mixer and the selective amplifier 1 for the purpose of rejecting the image frequency. The selective amplifier 1 comprises a bandpass filter 2, having a frequency transfer function H₁(f) centered on the value of the intermediate frequency IF. The output signals of this IF amplifier are formed of radar signals which are superimposed on the thermal noise generated by the radar system, and these output signals are applied to the inputs of two signal channels: a signal channel I and a signal channel Q. Each of these signal channels I and Q comprises a phase detector 3 and 4 and these phase detectors are controlled respectively by the quadrature output signals of a coherent local oscillator 5. These two phase detectors supply bipolar video frequency signals which correspond to the orthogonal components of the input signals and these signals are applied respectively to identical low pass filters 6 and 7 having a transfer function H₂(f). The transfer functions H₁(f) of the bandpass filter 2, and H₂(f) of the low pass filters 6 and 7 are such that the product H₁(f). H₂(f) is an approximation of the frequency transfer function H(f) of the filter matched to the pulse signals emitted by the radar system. The output of each of these low pass filters 6 and 7 is sampled by the sampler-disablers 8 and 9 and these sampler-disablers are controlled by a sampling signal provided by a clock circuit 10 which operates in synchronism with the pulse signals emitted by the radar system. The rate of this sampling signal is substantially equal to $Fh = 2k/\delta$, where $\delta$ is the pulse duration of the emission signals and k is a proportionality factor which depends on the particular form of the pulses and is of the order of 0.6 in the case of standard pulses. The sampler-disablers 8 and 9 are connected respectively to analog-digital coders (A/D) 11 and 12 controlled by a signal derived from the samplng signal. These A/D coders are a high resolution type for example, capable of coding the amplitude of each sample over 12 bits and they operate at a rate of the order of a 1 MHz. The coded samples $S_I$ and $S_Q$ available respectively at the output of the signal channels I and Q are supplied to a digital processor which filters out the clutter signals and extracts the signals reflected by the targets having a radial speed component with respect to the radar system.

Figure 2:
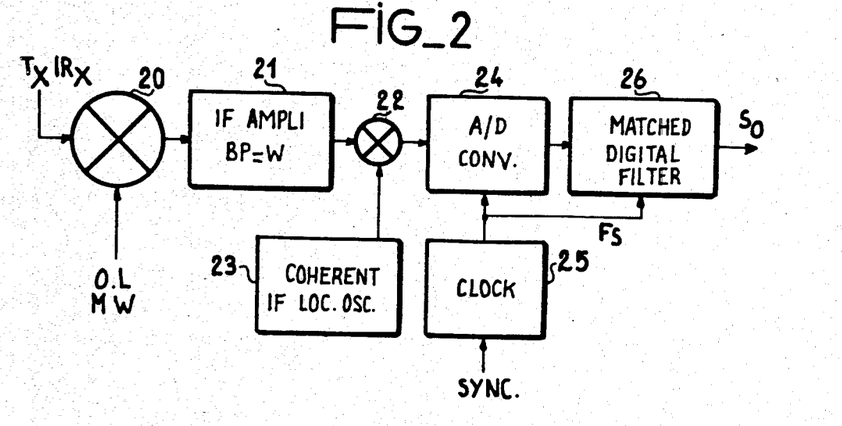
FIG. 2 is a functional diagram of a radar receiver in accordance with the invention.

FIG. 2 is a functional block diagram of a radar receiver according to the invention having a single signal channel. This receiver comprises more especially a microwave frequency input mixer 20 whose signal and reference inputs are connected respectively to the duplexer device Tx/Rx and to the local microwave oscillator (MW) of the radar system. The output of this microwave mixer is connected to an amplifier 21 which operates at an intermediate frequency IF and the band width, or passband W of this IF amplifier has a value substantially equal to 2.n times the spectral width K/δ of the pulse signals radiated by the antenna; the meaning of parameters K and δ have been defined above. The output of the intermediate frequency amplifier 21 is connected to a phase detector 22 controlled by the output signal of a coherent intermediate frequency (IF) oscillator 23. The output signals from this phase detector are applied to an A/D coder 24 controlled by a sampling signal delivered by a clock signal generator 25. The frequency of this sampling signal has a value $F_s$ substantially equal to 2.n.k/δ, so the band width W of the intermediate frequency amplifier 21 and this clock signal one synchronized by the signal SYNC triggering the transmission pulses. With this A/D coder, the analog bipolar signal of the phase detector can be coded over P levels and the coder delivers samples coded in the form of binary words of N binary digits, such as $P=2^N$, and at a rate equal to the frequency Fs of the sampling signal. These coded samples are applied to the input of digital filter 26 whose pulse response h(t) is matched to the pulse signal transmitted by the radar transmitter and this digital filter operates over N consecutive samples. The result is that the output signals $S_o$ is this "matched" digital filter are formed of samples coded in the form of words of n.p digits and at a rate Fs. This matched digital filter brings to the signal a gain 20 Log.n and to the noise a gain of 10 Log.n, whence an improvement in the signal/noise ratio at the output of the digital filter of 10 Log.n. The dynamics of the useful signal are thus also increased by 10 Log.n. This receiver behaves substantially as a conventional receiver, however at the output of the receiver information is available coded at a frequency n times greater than that of the conventional receiver, the number of quantization levels is equal to n.p substantially equal to or greater than the number $P_o$ of levels of a conventional receiver and, the matched filter may approximate the optimum matched filter. In practice, for example, the value of n may be between 8 and 24 if the value of P is of the order of 256. However, it should be noted that since the band width W of the IF amplifier 21 is n times greater than that of the IF amplifier of a conventional receiver, the value of the IF frequency must be higher, for example of the order of 200 to 300 MHz, which may present an advantage since the receiver will only comprise a single frequency transposition. The coded samples of the output signal $S_o$ are fed into a digital processor for further processing as indicated above.

It may be noted that although the radar system operates with variable pulse durations $(\delta_o, \delta_1, \delta \ldots n)$ with $\delta_o$ the shortest pulse duration, the matched digital filter 26 must operate over a number m of coded samples proportional to the pulse duration considered. If the value of n corresponds to the pulse of shortest duration, the values of m $(m_1, \ldots m_n)$ are always greater than the value of n.

Figure 3:
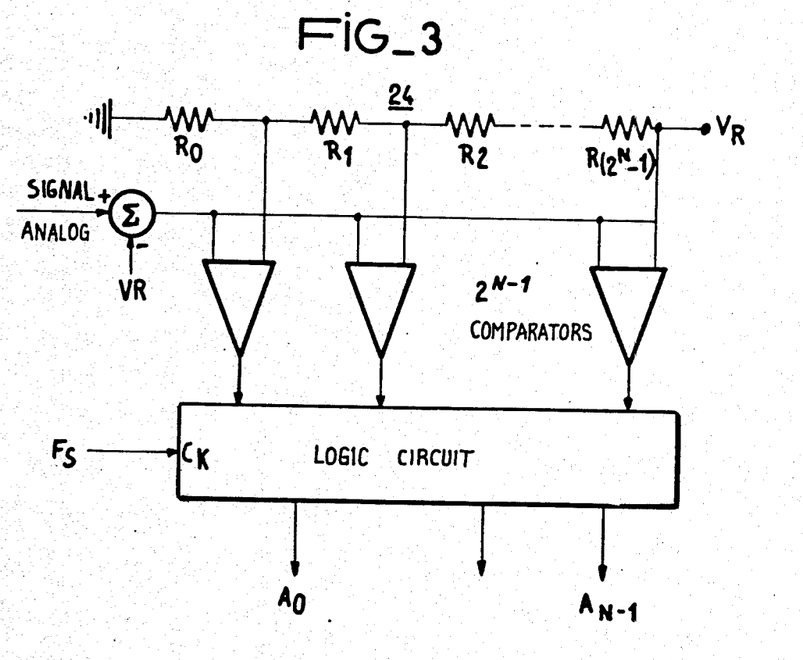
FIG. 3 is an electric diagram of one embodiment of the analog-digital coder.

FIG. 3 is an electric diagram of an N bit A/D coder which may be used for forming the A/D coder 24 of FIG. 2. This type of A/D coder is known under the name of "simultaneous A/D coder", and all the operations appear simultaneously. In this A/D coder, a series of $(2^N-1)$ voltage comparators effect independent decisions as to the magnitude of the analog voltage to be coded with respect to $2^N$ quantization levels supplied by a network of resistors $R_o$ to R $(2^N-1\ 1)$, all of identical value, and this network is connected to a calibrated reference voltage source $V_R$. For coding bipolar analog signals, a shift voltage $V_o = V_R/2$ is inserted in the input channel of the coder. A logic circuit having $(2^N-1)$ inputs is controlled by a sampling signal (Fs) and converts the decisions into binary words of N bits.(AS-A$_{n-1}$), including the sign bit. The simultaneous A/D coder, apparently complex because of the $(2^N-1)$ voltage comparators required, can now be easily produced by a large scale integration technique (LSI). For example, the model "TDC 1025 E 1 C" produced by the American firm TRW allows the amplitude of analog signals to be coded over 256 levels (N=8 bits) at rates of the order of 75 MHz. Moreover, it may be noted that this type of A/D coder does not required an input sampler-disabler.

Figure 4:
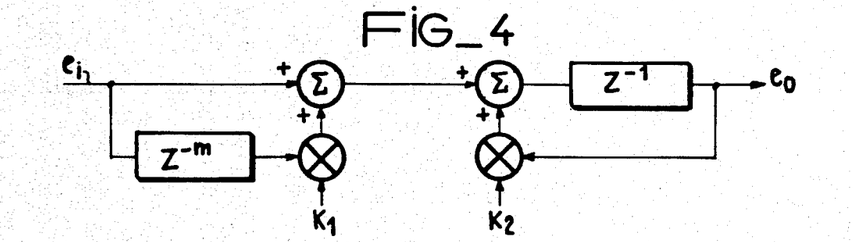
FIG. 4 is an electric diagram of a "matched" digital filter.

FIG. 4 is an electric diagram of a digital filter which may be used for forming the matched filter 26 of FIG. 2. In this filter configuration, the sampled input signal $e_i$ is applied to the inputs of the first adder, into which are also inserted a delay element $Z^{-m}$ (with $Z=e^{j\omega Ts}$), and a multiplier multiplying $Z^{-m}$ by a factor K1. The output of this first adder is connected to the input of an integrator to which a coefficient K2 is assigned and the output signal $e_o$ of this filter is taken at the output of the integrator. If the input signal $e_i$ is a rectangular signal sampled with a period $T_s$, the value of the coefficient K1 is fixed equal to $-1$ and the value of the coefficient K2 is fixed equal to unity, thus the corresponding Z transfer function is:

$$H(z) = \frac{e_o}{e_i} = \frac{Z^m - 1}{Z^{m+1} - Z^m}$$

On the other hand, if the duration S of the rectangular signal is equal to mTs, the frequency transfer function of the filter is:

$$H(f) = \frac{\sin \pi f \delta}{\pi f \delta}$$

Figure 5:
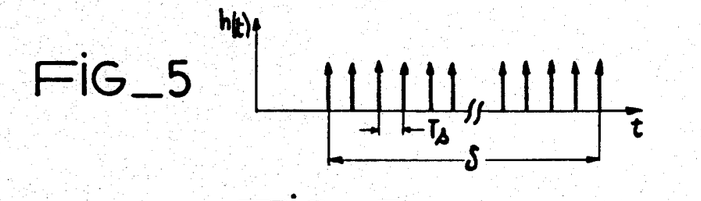
FIG. 5 shows the pulse response of the digital filter of FIG. 4.

The pulse response of the filter is shown in FIG. 5, it corresponds to a signal of duration $\delta = nTs$.

Figure 6:
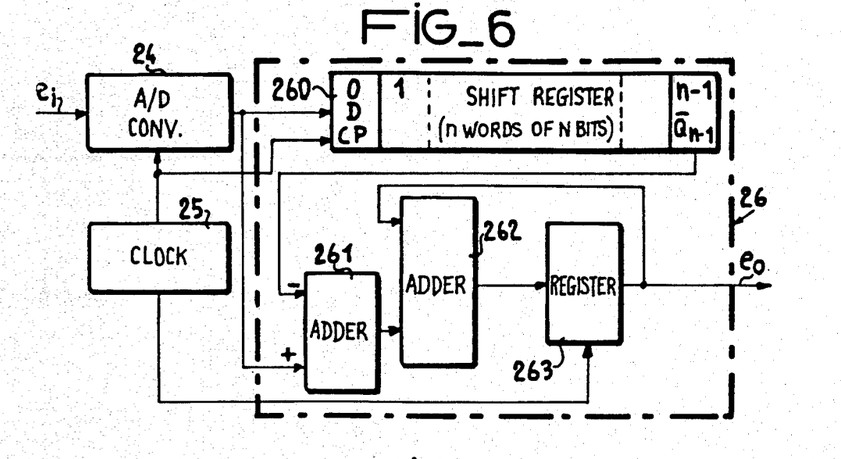
FIG. 6 is a functional block diagram of one embodiment of the digital filter of FIG. 4.

It may be noted that the filter of FIG. 4 is formed of two sections: a first section which is formed by a differentiator and a second section which is formed by an integrator. FIG. 6 is a block diagram which shows one embodiment of the filter described in FIG. 4. The coded samples delivered by the A/D coder 24 are applied to the input (D) of an element 260 providing a digital delay of duration equal to the duration of the transmitted pulses. The input and the complemented output ($\overline{Q}n-1$) of this delay element are connected to the input of a first adder 261. The output of this first adder is supplied to an accumulator formed by a second adder 262 and a register 263 looped to the second input of this second adder, and this register 262 is controlled by the clock signal generator 25. The digital delay element 260 may be formed by a shift register having N stages of N bits and the shift input (CP) is connected to the clock signal generator 25. It may be noted that this shift register may be of the programmable type so as to allow the delay duration to be varied and so the cut off frequency of the filter. In one embodiment, the delay element 260, may be formed by an FI FO memory (first in first out) having a number m of registers with m greater than n. It can now be seen that it is possible, while keeping the same elements, to readily match the filter to different pulse durations. This property may be used when the radar system operates with pulses of variable durations.

Figure 7:
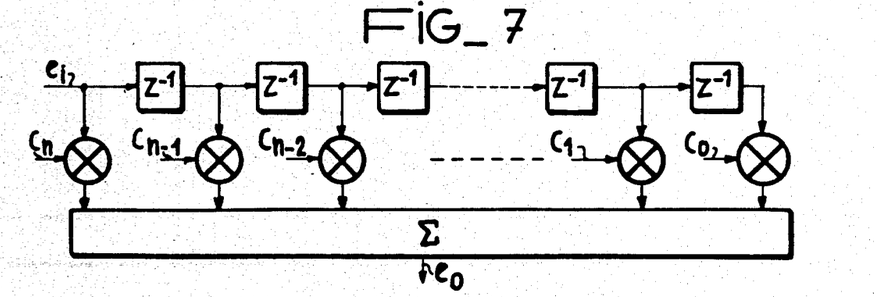
FIG. 7 is an electric diagram of a digital filter of the transverse type.

FIG. 7 is an electric diagram which shows the configuration of a digital transverse filter which may also be used for forming the digital matched filter 26 of FIG. 2. In this type of filter, n elements of delay $Z^{-1}$ are disposed in series, and (n+1) multipliers are connected respectively to the junction points of the delay elements. To these multipliers are assigned weighting coefficients, respectively $C_o$ to $C_{n-1}$ and the outputs of these multipliers are summed. By adjusting the value of the weighting coefficient Ci, the pulse response of the filter may be formed and adapted to different pulse shapes. For example, to obtain a rectangular shaped pulse response, all the coefficients $C_o$ to $C_{n-1}$ of the multipliers are equal to unity. This apparently complex type of filter may be formed according to large scale integration (LSI) and bit slice technique. One example of such a filter is provided by the "model TDC 1028" produced by the American firm TRW. Different slices may be connected in cascade for increasing the number of sections of the filter and interconnected in parallel for increasing the size of the binary words of the input signals and/or of the weighting coefficients. It can be seen that this type of transverse filter has great flexibility in use and allows the pulse response to be matched to varying pulse shapes and durations.

Figure 8:
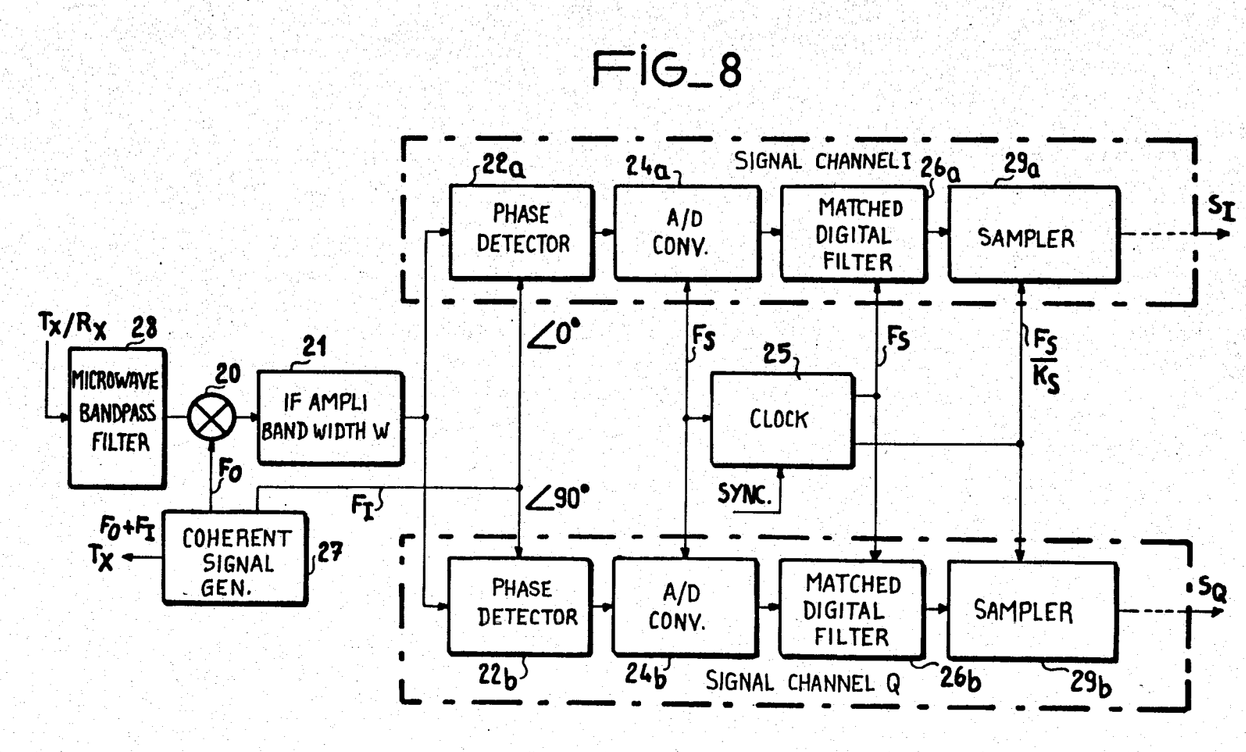
FIG. 8 is a functional block diagram of a radar receiver in accordance with the invention comprising two signal channels I and Q.

FIG. 8 refers to FIG. 2 and in the form of a block diagram shows a radar receiver comprising two signal channels I and Q. The input of the microwave mixer 20 of the receiver is coupled to a duplexer device Tx/Rx, (not shown) through a microwave bandpass filter 28 which rejects the interference signals at the image frequency. The reference input of the microwave mixer 20 is connected to a coherent signal generator which delivers: the reference signal at a microwave frequency Fo, a signal at a microwave frequency Fo+Fi which is chopped and amplified in the transmission sub-assembly Tx and a reference signal of IF frequency which is supplied to the two phase detectors 22a and 22b. The IF amplifier, as described above, is a selective amplifier whose passband has a value W, centered on the IF frequency. The output of the IF amplifier is supplied to two identical signal channels I and Q in which the phase detectors operate in phase quadrature. The clock signal generator 25 is synchronized by the signal SYNC triggering the transmission pulses. This clock signal generator delivers: sampling signals which control the operation of the A/D coders 24d and 24b and synchronous signals for sequencing the elements of the digital matched filter 26a and 26b.

The output signals of the matched filters comprise a certain degree of redundancy and for this reason it is possible, by means of samplers 29a and 29b, to retain only one out of n of these output signals. For this, the clock signal generator comprises a frequency divider, dividing by a factor $Ks=1/n$, which delivers signals at a frequency $F_s/K_s$ where $F_s$ if the frequency of the sampling signal. It should however be noted that these samplers 29a and 29b are optional elements and that, in their absence, the output signals $S_I$ and $S_Q$ reproduce substantially in digital form the analog input signals.

By way of indication, the A/D coders may code the amplitude of the analog signals of 256 levels and the value of n may be chosen of the order of 16 which makes available output signals $S_I$ and $S_Q$ over 4096 levels.

Figure 9:
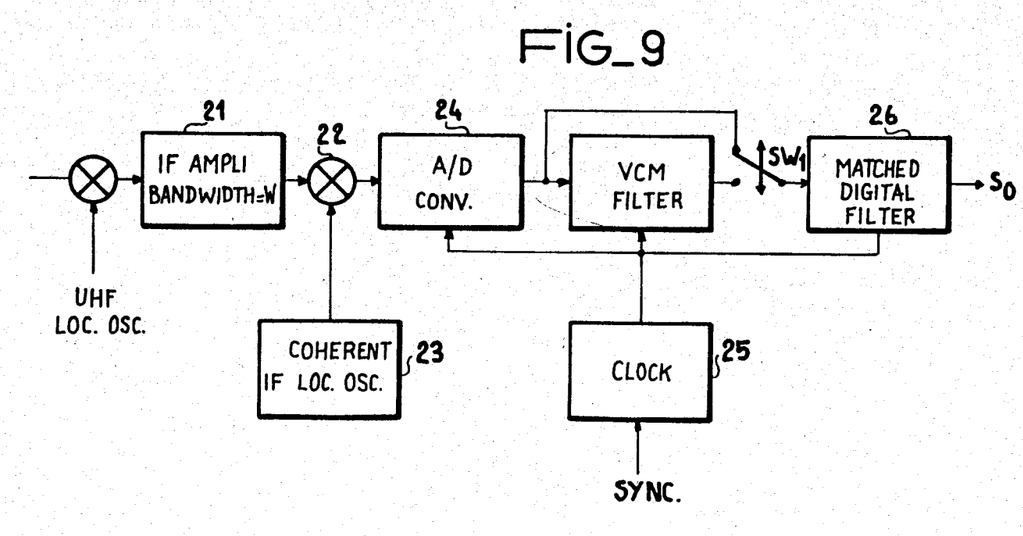
FIG. 9 is a functional block diagram of a receiver in accordance with the invention in which a VCM filter is included.

FIG. 9 is a functional block diagram which shows a variant of the receiver of FIG. 2. It may be noted that, since the matched digital filter 26 is a linear element, it is possible to insert a VCM filter 100 between the A/D coder 24 and the matched filter 26; the function of the VCM filter is to reject the undesirable echo signals. This VCM filter may be formed for example by a conventional digital filter having transmission zeros located on multiples of the recurrence frequency of the transmission pulses. The sequencing input of this VCM filter is also connected to the clock signal generator 25. The operating zone of the VCM filter may be limited to the near zones, and for this purpose an inverter $SW_1$ is inserted between the matched filter 26 and the output of the VCM filter and the second input of the inverter is connected to the output of the A/D coder. The output signals $S_o$ of the matched filter 26 are possibly fed to a complementary processor and to an indicator visualizing the moving targets. This variant also applies to the receiver of the FIG. 8, in this case a VCM filter is inserted between the A/D coder 26a or 26b and the matched filter 29a or 29b of each of the signal channels I and Q.

The advantages provided by the invention can now be clearly seen. In particular, the weakest link of the receiver which is formed by the sampler-disabler and the analog-digital coder may now be overcome. The A/D coder is a low cost component. The detection performance of the radar system is substantially improved because of, on the one hand, the over sampling of the video frequency signals and, on the other hand, because of the possibility of matching the pulse response of the output filter to the shape of the pulse signals transmitted. In addition the receiver may comprise a single frequency transposer.

The invention is not limited in its applications and characteristics to the receiver described by way of illustration. In particular, the Doppler radar system may be of the coherent type comprising a magnetron tube transmitter. However, other embodiments of the A/D coder and of the matched digital filter may be contemplated.

A radar receiver construction in accordance with the invention may in general find its application in pulse signal transmission systems and more especially in Doppler radar systems.

What is claimed is:

1. Receiver apparatus for a pulsed Doppler radar which has a duplexer, a local microwave oscillator, and a transmitter whose pulses are triggered by a SYNC signal, comprising:
   input mixer means adapted for receiving input signals from said duplexer and said microwave oscillator, and for mixing these input signals and providing a mixer output signal;
   IF amplifier means for receiving said mixer output signal and providing an amplifier output signal, said amplifier means operating at an intermediate frequency and having a passband substantially equal to $2n \times k/\delta$, where n is an integer, K is Boltzman's constant, and $\delta$ is the pulse duration of the transmitter pulses;
   coherent IF oscillator means for providing an IF oscillator output signal;
   phase detector means for receiving the output signals from said IF amplifier means and said coherent IF oscillator means, and for providing a phase detector output signal;
   clock means, adapted for receiving said SYNC signal, and for providing a sampling signal having a frequency substantially equal to $2n \times K/\delta$, said clock means being triggered by said SYNC signal to cause said sampling signal to be synchronized with the output signal from said IF amplifier means;
   A/D coder means for receiving said sampling signal and said phase detector output signal, and for providing sample signals coded as binary words, said sample signals having a frequency substantially equal to the frequency of said sampling signal; and
   matched digital filter means for receiving said sample signals and said sample signal, and for providing a receiver output signal, said digital filter means having a pulse response matched to the transmitter pulses.

2. Apparatus according to claim 1 wherein said phase detector means provides an output signal comprising a video frequency bipolar signal.

3. Apparatus according to claim 1 wherein said A/D coder means samples and codes, in amplitude, the output signal of said phase detector means, the code being carried out over P levels where P is an integer, the sampling being carried out at a frequency substantially greater than a minimum NYQUIST sampling frequency.

4. Apparatus according to claim 3 wherein said matched digital filter means provides a digital receiver output signal which is coded over mP levels, where m is an integer substantially equal to or greater than n.

5. Apparatus according to claim 1 wherein said A/D coder means includes a simultaneous coder having a number of voltage comparators equal to a number of quantization levels used by said coder.

6. Apparatus according to claim 1 wherein said matched digital filter means includes a transverse filter having n sections and n+1 multipliers interdigitatedly coupled to said n sections, and wherein each multiplier has a weighting coefficient which is predetermined to cause a pulse response of said transverse filter to substantially match a shape of the transmitted pulses.

7. Apparatus according to claim 1 wherein said matched digital filter means includes a first section comprising a differentiator, and a second section comprising an integrator.

8. Apparatus according to claim 7 wherein said first section includes:
an adder having first and second inputs; and
a delay element having a complemented output coupled to said adder first input, said delay element comprising a FIFO memory.

9. Apparatus according to claim 1 further including a VCM filter coupled between said A/D coder means and said matched digital filter means.

10. Apparatus according to claim 1 further including sampler means coupled to an output of said matched digital filter means, for providing a control signal having a frequency which is a sub-multiple of the sampling signal frequency, said sampler means having an input coupled to said clock means.

11. Apparatus according to claim 1 wherein said phase detector means, said A/D coder means, and said matched digital filter means comprise a first channel, and further including a second channel substantially identical to said first channel and coupled to said clock means and said IF amplifier means, said phase detector means of said first and second channels operating in phase quadrature for supplying channel signals I and Q, respectively.

* * * * *